US012040168B2

(12) United States Patent
Ghorbani

(10) Patent No.: US 12,040,168 B2
(45) Date of Patent: Jul. 16, 2024

(54) DRIFT TUBE WITH TRUE HERMETIC SEAL

(71) Applicant: Optical Systems, LLC, Auburn, CA (US)

(72) Inventor: Arash Ghorbani, Auburn, CA (US)

( * ) Notice: Subject to any disclaimer, the term of this patent is extended or adjusted under 35 U.S.C. 154(b) by 0 days.

(21) Appl. No.: 17/766,203

(22) PCT Filed: Oct. 1, 2020

(86) PCT No.: PCT/US2020/053876
§ 371 (c)(1),
(2) Date: Apr. 1, 2022

(87) PCT Pub. No.: WO2021/067648
PCT Pub. Date: Apr. 8, 2021

(65) Prior Publication Data

US 2024/0063005 A1 Feb. 22, 2024

Related U.S. Application Data

(60) Provisional application No. 62/908,618, filed on Oct. 1, 2019.

(51) Int. Cl.
*H01J 47/00* (2006.01)
*H01J 9/26* (2006.01)

(52) U.S. Cl.
CPC .............. *H01J 47/008* (2013.01); *H01J 9/26* (2013.01); *H01J 47/002* (2013.01)

(58) Field of Classification Search
CPC ........... H01J 47/002; H01J 9/26; H01J 47/008
See application file for complete search history.

(56) References Cited

U.S. PATENT DOCUMENTS

| | | | |
|---|---|---|---|
| 5,722,868 A | 3/1998 | Raber et al. | |
| 6,066,918 A | 5/2000 | Suzuki et al. | |
| 2014/0062295 A1 | 3/2014 | Denissen et al. | |
| 2016/0211105 A1 | 7/2016 | Smith et al. | |
| 2019/0341239 A1* | 11/2019 | Schwed | G01T 1/185 |

FOREIGN PATENT DOCUMENTS

| | | |
|---|---|---|
| CN | 109640508 A | 1/2019 |
| WO | 2021/067648 A1 | 4/2021 |

OTHER PUBLICATIONS

Notification of Transmittal or Search Report and Written Opinion of the ISA, or the Declaration, form ISA/220; report dated Mar. 12, 2021 including International Search Report (ISA/210); Written Opinion of the ISA, (ISA/237), and Examiner's search strategy and results; for PCT Application No. PCT/US20/53876 filed Oct. 1. 2020. 13 Pages.

* cited by examiner

*Primary Examiner* — Chih-Cheng Kao
(74) *Attorney, Agent, or Firm* — SF Bay Area Patents, LLC; Andrew V. Smith

(57) ABSTRACT

A drift tube construction includes a thin wall aluminum tube with a thin wire at its center attached to a terminal. The tube is plugged at both ends. The terminal is embedded at the center of the plug with material insulating it from Drift tube main body. The Drift tube assembly is sealed and filled with a gas mixture. A voltage is applied to the thin wire via the terminal. Current drift tubes employ plastic material to insulate the terminal from Drift tube main body and O-rings to provide a near hermetic seal.

20 Claims, 10 Drawing Sheets

DRIFT TUBE WITH TRUE HERMETIC SEAL

PRIORITY

This patent application is a 371 of PCT/US20/53876, filed Oct. 1, 2020; which claims the benefit of priority to U.S. provisional patent application Ser. No. 62/908,618, filed Oct. 1, 2019, which is incorporated by reference.

BACKGROUND

1. Technical Field of the Invention

The present invention relates in general to Drift tubes, and particularly to the construction of drift tubes used in detection of subatomic particles including drift tubes with true hermetic seals.

2. Discussion of Background Art

A Drift tube is commonly used in detection of subatomic particles, such as muons. Drift tubes for detection of Muons are used at CERN (Conseil européen pour la recherche nucléaire) (Published paper, (ref:1)"New-High Precision Drift Tube Detector for ATLAS Muon Spectrometer", H. Krohaa, R. Fakhrutdinovb and A. Kozhinb Published 13 Jun. 2017 •© 2017 IOP Publishing Ltd and Sissa Medialab Journal of Instrumentation, Volume 12, June 2017.

Drift tubes are also used as Muon detectors for imaging at Sandia National Laboratories (ref:2)(Sandia Report, published in November 2016, SAND2016-11650). Drift tubes are conventionally constructed using a standard thin aluminum tube. Diameters of aluminum tubes stated in ref:1 and 2 are 15 mm and 30 mm. However larger diameters could be employed. Wall thickness of the aluminum tubes are of the standard, readily available, from 0.4 mm to 1 mm. Two plugs, one at each end seal the Drift tube. A thin wire is strung at the center of the tube attached to terminals inside the plugs at each end of the tube. Typically, as stated in reference 1, the wire is a gold plated Rhenium Tungsten (W—Re) with a diameter of 0.050 mm. The air inside the tube is evacuated and a gas mixture is introduced. An example of gas mixture used is Ar:CO2 with a ratio of 93 to 7 at 3 bar pressure pumped into the Drift tube assembly (ref:1). The plugs provide a sealed environment inside the Drift tube in order to maintain the gas mixture. There are different designs and procedures for introducing the gas mixture to the Drift tube assembly. Design stated in ref:1 employs the Anode area of the terminal to pump the gas mixture into the assembly, using a series of O-rings to seal the gas path. The said design although effective is not hermetically sealed. The terminals installed within the plugs are insulated from the plug and also provide a sealed environment. The common construction of Drift tubes employs O-rings in order to provide a seal between aluminum tube and plug. The terminal inside the plug is insulated from the plug using plastic material. The terminal is also sealed using O-rings. Plastic materials provide a suitable insulation between the terminal and the plug. However, O-rings do not provide an adequate hermetic seal. Over time O-rings will permeate and the concentration of the gas mixture inside the drift tube will degrade. Therefore, over the life time of a typical conventional drift tube, a gas mixture concentration may be monitored, and depending on a degree of degradation, a decision may be made to replace or refill the drift tube with fresh gas mixture. This refilling of the gas mixture costs time and money. Continued use of a drift tube with a sufficiently degraded gas mixture may yield unreliable or otherwise untrustworthy results.

Seals employing polymeric material such as O-rings are non-hermetic. Construction of devices using polymers or molded material are known to be "non-hermetic" or "near-hermetic," not true hermetic seals according to military specifications. (Reference: Hermeticity of Electronic Packages, H. Greenhouse).

DETAILED DESCRIPTION OF THE EMBODIMENTS

Figure 1A:
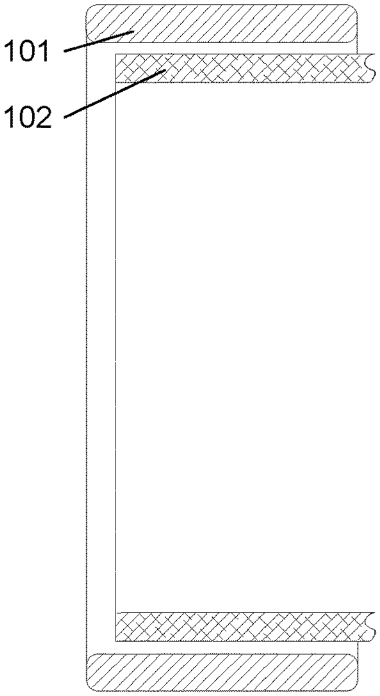
FIG. 1A schematically illustrates a cross-sectional side view of a drift tube at ambient temperature just prior to switching on a band heater disposed at one end of the tube in accordance with example embodiments.

Several example embodiments employ a knife edge, multiple knife edges and/or a double knife edge design to create a hermetic seal between dissimilar materials. Example embodiments also include glass to metal techniques, for example, to provide a true hermetic seal for the drift tube anode terminal.

A drift tube 102 may employ plastic material 103 to insulate the anode terminal 120 from the drift tube main body 102. However, rubber or plastic O-rings are insufficient to provide a true hermetic seal between the tube 102, see FIGS. 1A-1B, which may be for example an aluminum tube 102, and an end plug 103, see FIG. 1C. The anode terminal

120 inside the plug 103 may be insulated from the plug 103 using plastic material particularly when the plug 103 in accordance with some embodiments is formed from conducting or semiconducting materials or from a materials that insulates poorly or unreliably. The anode terminal 120 will not be hermetically sealed through use of rubber or traditional hard plastic O-rings. Machinable plastic materials with good electrical insulation properties such as Teflon, Peek, Delrin, and Noryl may be used to provide a suitable insulation between the terminal 120 and the plug 103.

Knife Edge Tube End Plug Seals

Figure 1B:
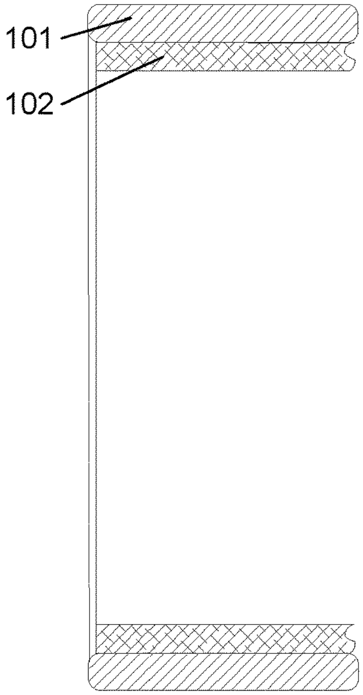
FIG. 1B schematically illustrates a cross-sectional side view of an expanded drift tube at a higher temperature with a larger inner diameter compared with FIG. 1A after being heated by the band heater in accordance with example embodiments.
Figure 1C:
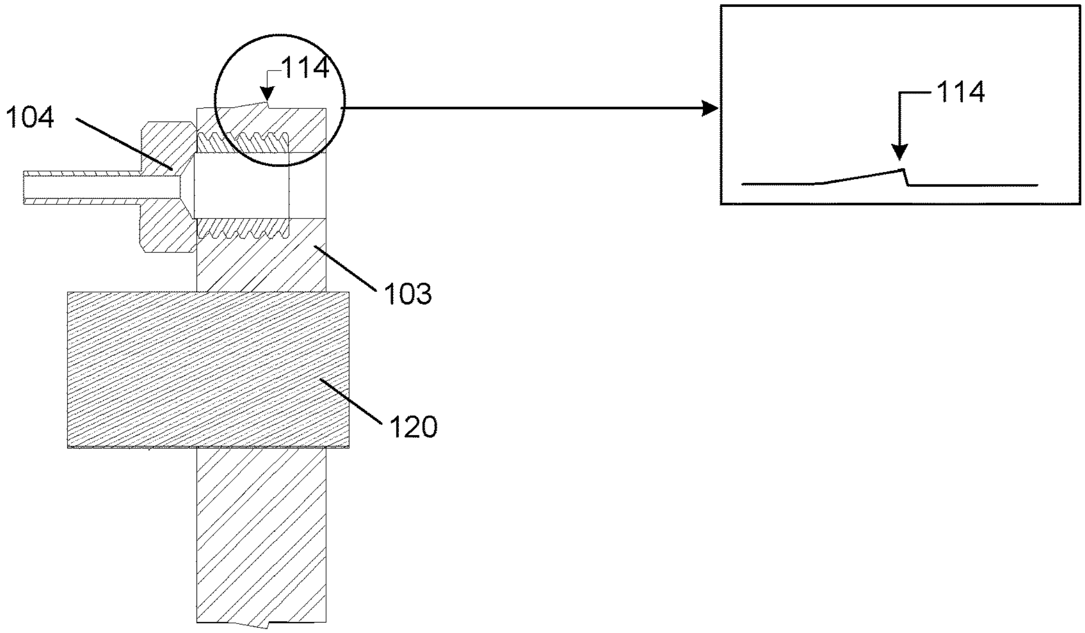
FIG. 1C schematically illustrates a cross-sectional side view of an end plug including a gas feedthrough, an electrical feedthrough and a knife edge protruding radially outward from the periphery of the end plug for hermetically sealing the drift tube of FIGS. 1A-1B in accordance with certain embodiments, wherein the diameter of the end plug of FIG. 1C at the knife edge protrusion is too large to insert into the drift tube of FIG. 1A at ambient temperature but will fit into the end of the expanded drift tube of FIG. 1B at the higher temperature provided by heating with the band heater.
Figure 1D:
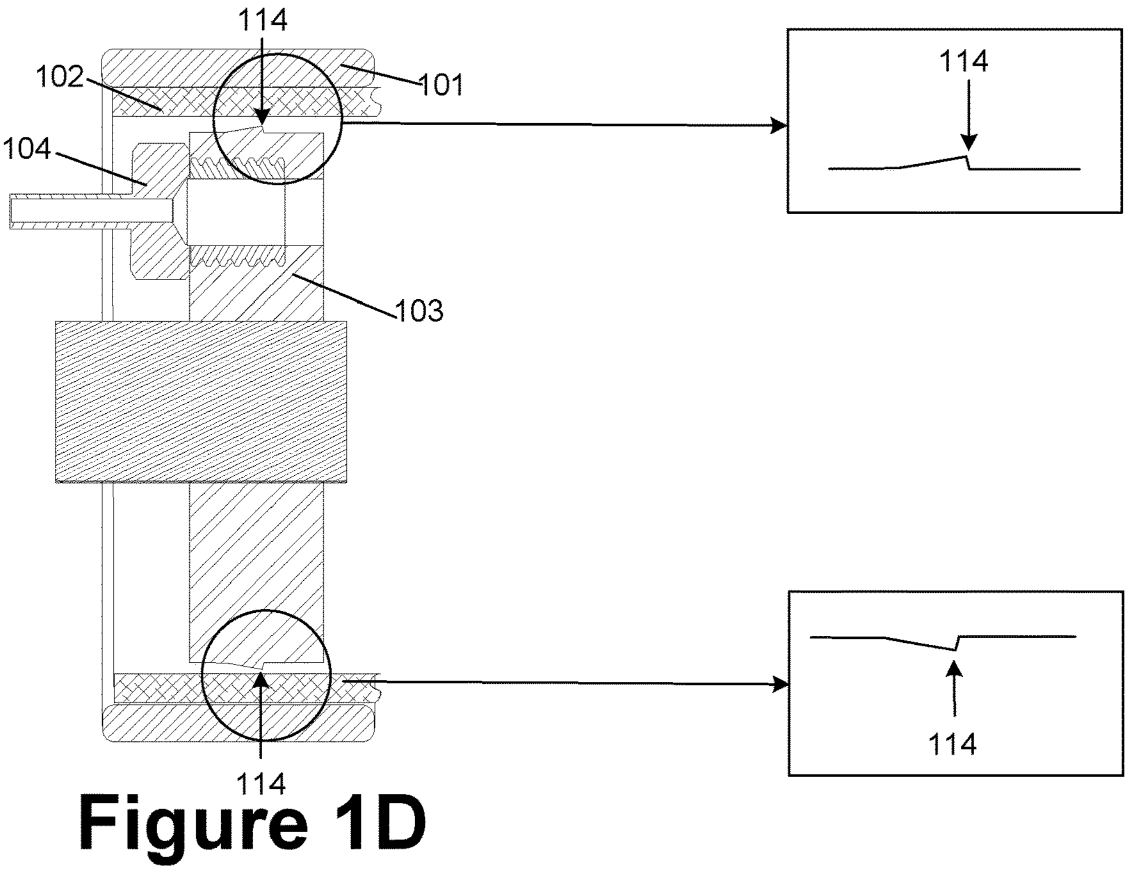
FIG. 1D schematically illustrates a cross-sectional side view of the end plug of FIG. 1C inserted at the end of the expanded drift tube of FIG. 1B which has been heated to a higher temperature than in FIG. 1A in accordance with example embodiments.
Figure 1E:
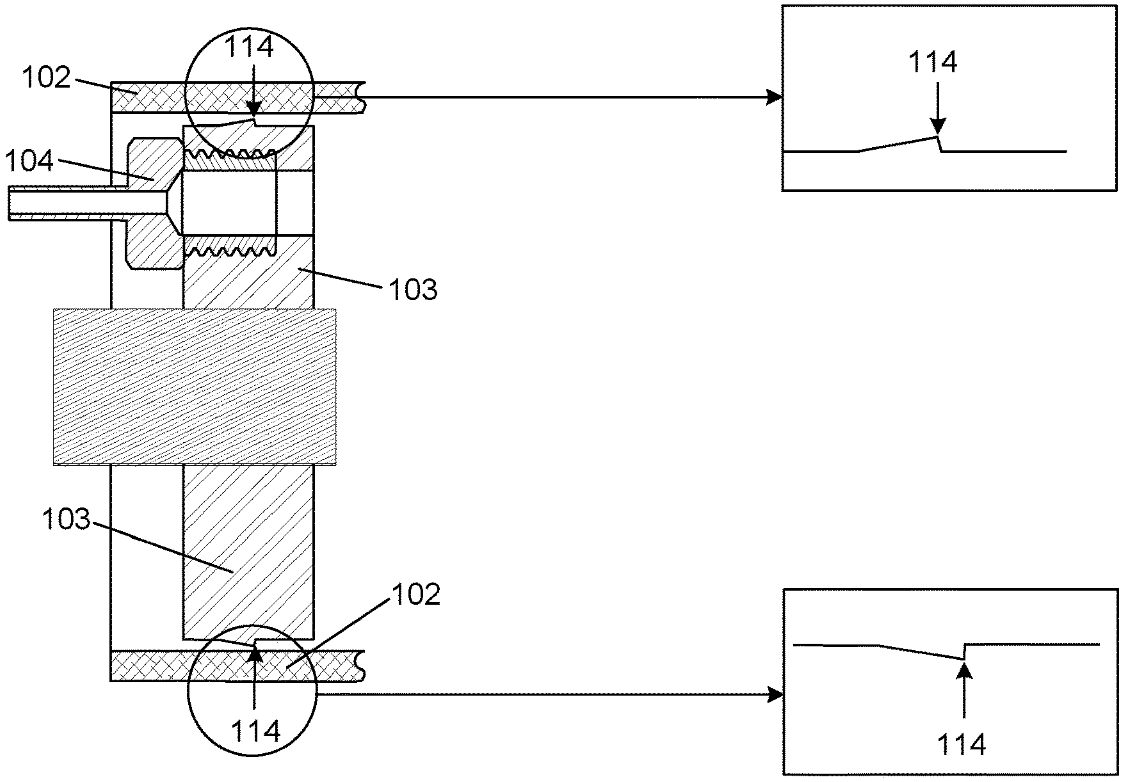
FIG. 1E schematically illustrates a cross-sectional side view of the removal of the band heater from the end of the drift tube with the end plug of FIG. 1C inserted as in FIG. 1D.
Figure 1F:
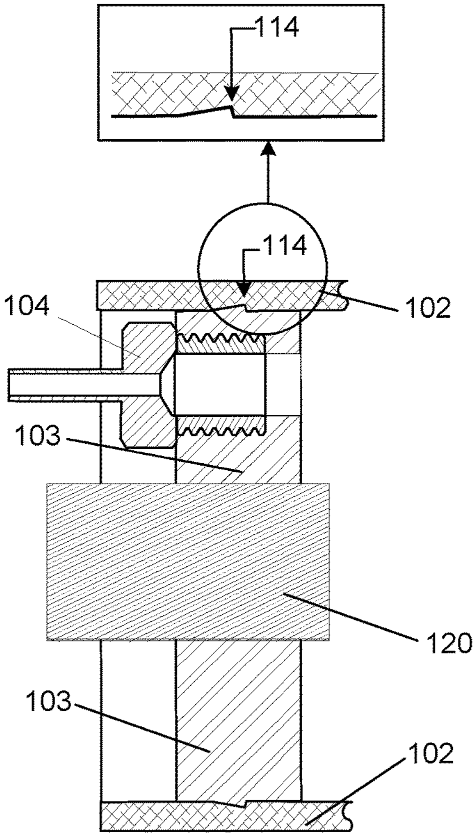
FIG. 1F schematically illustrates a cross-sectional side view of the drift tube of FIG. 1E after cooling and shrinking such that the knife edge of the inserted end plug has penetrated the inner surface of the tube creating a hermetic seal between the tube and the end plug in accordance with example embodiments, FIG. 1G schematically illustrates an axial cross-sectional view through the apex of the knife edge of the end plug of the sealed end of the drift tube of FIG. 1F.

FIGS. 1A-1G schematically illustrate example embodiments of processes for assembling drift tubes that provide a true hermetic seal between the plug and the drift tube, which may be an aluminum tube. A knife edge 114 and application of heat 101 for expansion of the tube 102, followed by cooling and compression as in FIGS. 1E-1F are utilized in example embodiments that are schematically illustrated and described herein to hermetically seal the end of a drift tube.

FIG. 1A schematically illustrates a cross-sectional side view of a drift tube at ambient temperature just prior to switching on a band heater disposed at one end of the tube in accordance with example embodiments.

FIG. 1B schematically illustrates a cross-sectional side view of an expanded drift tube at a higher temperature with a larger inner diameter compared with FIG. 1A after being heated by the band heater in accordance with example embodiments.

FIG. 1C schematically illustrates a cross-sectional side view of an end plug including a gas feedthrough, an electrical feedthrough and a knife edge protruding radially outward from the periphery of the end plug for hermetically sealing the drift tube of FIGS. 1A-1B in accordance with certain embodiments, wherein the diameter of the end plug of FIG. 1C at the knife edge protrusion is too large to insert into the drift tube of FIG. 1A at ambient temperature but will fit into the end of the expanded drift tube of FIG. 1B at the higher temperature provided by heating with the band heater.

FIG. 1C shows a NPT standard tapered thread fitting that may be used in order to introduce a gas mixture into a drift tube assembly. A mechanical valve at the end of the NPT fitting, not shown, would be used to provide a seal once the gas mixture is introduced. A drift tube with true hermetic seal as described in several example embodiments herein has a low leak rate of not more than (1×10-10 atm-cc/sec) to (1×10-11 atm-cc/sec) using helium as a sniffer gas. In each of the example embodiments described herein, a permeation rate is reduced to an extremely low level compared with conventional techniques, thus allowing a gas mixture concentration of the drift tube to remain intact for many years without the need of replacement or refilling.

A plug 103 may be designed with a knife edge 114 protruding radially from its outside diameter surface. An aluminum tube 102 will have an inside diameter that is initially smaller at ambient temperature than the outside diameter of the end plug 103, such that there is mechanical interference between the inside diameter of tube 102 and the outside diameter of plug 103. The amount of interference is calculated based on operating diameter of the Drift tube. The aluminum tube is then heated using a band heater 101 as in FIG. 1A to a temperature where the inside diameter of the tube is expanded sufficient to allow insertion of the plug 103 into aluminum tube 102 with no interference. For example, a 30 mm diameter drift tube with 1 mm wall thickness will have an inner diameter of 28 mm.

The outer diameter of the knife edge 114 of the plug 103 may be designed to be 28.13 mm in an example embodiment, therefore there is a 0.13 mm interference in this example. The Coefficient of Thermal Expansion (CTE) for 6061-T6 aluminum is 23.6 micro-m/m-C°. Using thermal expansion equation: Dc=dT×Di×CTE, where Dc is the change in diameter, dT is differential temperature and Di the initial diameter. A minimum temperature of 220° C. (assuming initial temperature of 23° C.) would be the temperature of the aluminum tube 102 enabling insertion of the plug 103 into the aluminum tube 102.

The knife edge 114 has, in certain example embodiments, no larger than a 0.001 inch radius on its apex to ensure penetration of the aluminum tube 103 sufficiently in order to provide a true hermetic seal. The angle between two sides of the knife edge 114 in certain embodiments is approximately 90 degrees, and may be between 60 degrees and 100 degrees. This angle is selected for supporting the pressure exerted on the knife edge 114 by aluminum tube 102.

The knife edge protrusion 114 above the plug's body diameter may be between 0.13 mm and 0.18 mm in example embodiments. The knife edge 114 may be as low as 0.08 mm in alternative embodiments with use of exceptionally durable materials. For example the penetration depth of the knife edge of a 316 stainless steel plug into a 6061-T6 aluminum Tube may be on the average 0.075 mm in one example wherein the value 0.075 mm may be for an aluminum tube of 1 mm wall thickness with an outside diameter of 30 mm. The penetration depth of a knife edge 114 of a plug 103 into an aluminum tube 102 in other example embodiments may be between 0.05 mm and 0.1 mm using one subset of materials and conditions, and between 0.025 mm and 0.2 mm using another subset of materials and conditions.

FIG. 1D schematically illustrates a cross-sectional side view of the end plug 103 of FIG. 1C inserted at the end of the expanded drift tube 102 of FIG. 1B which has been heated to a higher temperature than in FIG. 1A in accordance with example embodiments.

FIG. 1E schematically illustrates a cross-sectional side view of the removal of the band heater 101 from the end of the drift tube 102 with the end plug 103 of FIG. 1C inserted as in FIG. 1D.

In certain example procedures, once a plug 103 is inserted into an aluminum tube 102 of a drift tube assembly in accordance with example embodiments, the heat 101 may be removed and the assembly may be allowed to cool. As the assembly cools, the aluminum tube 102 at its inside surface approaches and then eventually crashes against the knife edge 114 of the plug 103. A hermetically sealed interface may be created in this way.

Figure 1G:
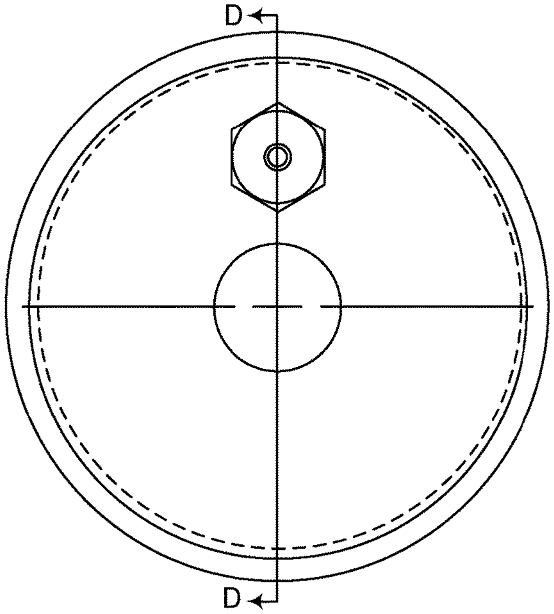

FIG. 1F schematically illustrates a cross-sectional side view of the drift tube of FIG. 1E after cooling and shrinking such that the knife edge 114 of the inserted end plug 103 has penetrated the inner surface of the tube 102 creating a hermetic seal between the tube 102 and the end plug 103 in accordance with example embodiments, FIG. 1G schematically illustrates an axial cross-sectional view through the apex of the knife edge 114 of the end plug 103 of the sealed end of the drift tube 102 of FIG. 1F.

Referring to the schematic illustrations of example embodiments for producing hermetic seals sufficiently worthy over time to be labelled as such, FIGS. 1A-1G may include an illustrative example. Gas feedthrough 104 may be inserted into the end plug 103. A source of heat 101 such as a band heater 101 may be inserted over a drift tube housing 102. Heat 101 may be applied to the end of the tube 102 until a specific temperature is reached. The end plug 103 may be inserted into the end of the tube 102 when the hot end of the tube 102 has reached the specific temperature. After insertion of end plug 103 into the hot end of the tube 102 in certain embodiments, the heat 101 may be removed or turned off and the assembly may be allowed to cool. The heat 101 may be changed to cooling or fan mode to remove heat faster or the heat may be turned down gradually to remove heat slower depending on the materials being used.

Plug material 103 in certain example embodiments may be selected to have approximately 1.3 times larger hardness value, or greater, than the aluminum tube 102 in order for the knife edge 114 to penetrate the aluminum tube's inner surface. Hardness Rockwell B value for Aluminum 6061-T6 is 60, and that of 316 Stainless steel is 79 for example. Examples of plug material 103 are Stainless steel, Kovar, Invar, and Titanium among many others having similar properties. The aluminum tube inner diameter surface has in certain embodiments a roughness finish of 30 microinches or better. The roundness tolerance of the aluminum tube may be maintained in certain embodiments to be within 0.002 inches or better.

The above procedure is performed for the two plugs 103, one at each end of the tube 102. The assembly could take approximately 30 minutes to cool with ambient temperature at around 23° C. However, the assembly could be cooled using a small fan directed at the plug within 5 minutes. Purging of the assembly and refill with gas mixture could commence once the assembly has reached room temperature.

Terminal Feedthrough Seals

FIGS. 2A-2M schematically illustrate example embodiments of processes for assembling drift tubes that provide insulation and sealing of an electrical terminal feedthrough within end plugs using glass to metal seals. In some embodiments, a glass to metal seal is formed between the end plug 203 and the anode terminal 205 first prior to forming another seal between the end plug 203 and the drift tube outer housing 202, e.g., an aluminum tube 202.

Referring now to the example embodiments illustrated schematically at FIGS. 2A-2M, a plug assembly 203 defining a terminal feedthrough aperture therein may be packaged with an anode terminal 209 through the center of the plug 103 that is insulated from the plug 103 by glass material 105 in the form of a glass ring 105 or a glass sleeve 205 for example. A glass to metal sealing process is described with reference to FIGS. 2G-2M that provides insulation and a hermetic seal, while alternative embodiments are illustrated schematically at FIGS. 2N, 2O and 2P with the main difference being the relative ordering of the tightening of retaining ring 210 and formation of the knife edge seals 212 and 213 and the assembling of the outer layers of the drift tube around the anode terminal feedthrough 204 including the glass ring 205 or glass sleeve 205, the end plug 203 and the tube 202 and the formation of the plug to tube seal using knife edge 214.

Figure 2A:
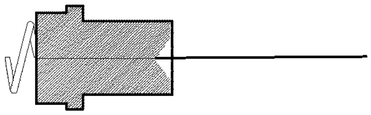
FIG. 2A schematically illustrates a cross-sectional side view of a wire fed through a wire gripper and coupled to a conducting spring that is configured for electrically contacting an anode terminal of a drift tube in accordance with example embodiments.
Figure 2B:
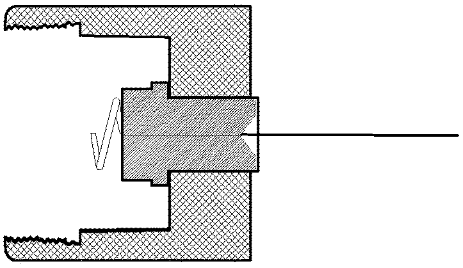
FIG. 2B schematically illustrates a cross-sectional side view of the wire, wire gripper and electrical contact spring of FIG. 2A enclosed by a feedthrough jacket in accordance with example embodiments.

FIG. 2A schematically illustrates a cross-sectional side view of a wire 207 fed through a wire gripper 206 and coupled to a conducting spring 208 that is configured for electrically contacting an anode terminal 209 of a drift tube in accordance with example embodiments. FIG. 2B schematically illustrates a cross-sectional side view of the wire 207, wire gripper 206 and electrical contact spring 208 of FIG. 2A enclosed by a feedthrough jacket 204 in accordance with example embodiments.

Double Knife Edge Terminal Feedthrough Seals

Figure 2C:
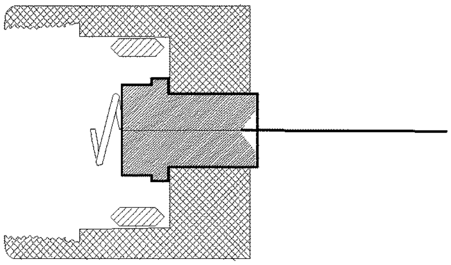
FIG. 2C schematically illustrates the wire, wire gripper and electrical contact spring enclosed by the feedthrough jacket of FIG. 2B with a double knife edge sealing ring inserted just at the periphery of a cylindrical anode terminal cavity defined at the center of the feedthrough jacket in accordance with example embodiments.

FIG. 2C schematically illustrates the wire 207, wire gripper 206 and electrical contact spring 208 enclosed by the feedthrough jacket 204 of FIG. 2B with a double knife edge sealing ring 211 inserted just at the periphery of a cylindrical anode terminal cavity defined at the center of the feedthrough jacket 204 in accordance with example embodiments.

Figure 2D:
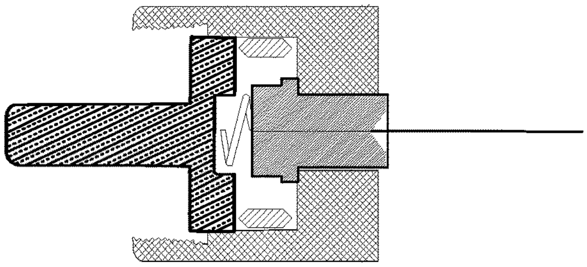
FIG. 2D schematically illustrates the wire, wire gripper, and electrical contract spring enclosed by the feedthrough jacket with the double knife edge sealing ring inserted therein in as in FIG. 2C with an anode terminal inserted that has an approximately same outer diameter as the double knife edge sealing ring that just fits the anode terminal cavity defined in the feedthrough jacket in accordance with example embodiments.

FIG. 2D schematically illustrates the wire 207, wire gripper 208, and electrical contract spring 208 enclosed by the feedthrough jacket 204 with the double knife edge sealing ring 211 inserted therein in as in FIG. 2C with an anode terminal 209 inserted that has an approximately same outer diameter as the double knife edge sealing ring 211 that just fits the anode terminal cavity defined in the feedthrough jacket 204 in accordance with example embodiments.

Figure 2E:
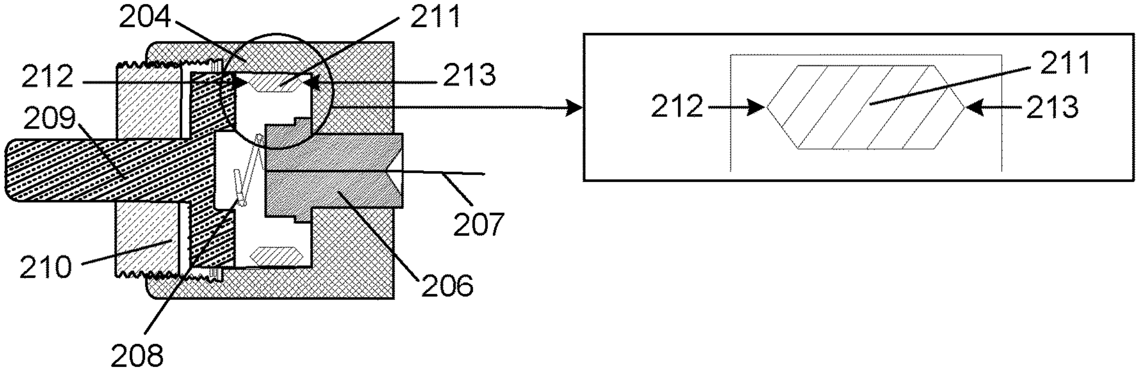
FIG. 2E schematically illustrates a cross-sectional side view of the assembly of FIG. 2D with a threaded retaining ring that has just started to be engaged with a complementary threaded inner surface portion of the feedthrough jacket, and wherein the threaded retaining ring is disposed axially adjacent to a top side of an outer portion of the anode terminal and is closed around an axially elongated inner portion of the anode terminal in accordance with example embodiments.
Figure 2F:
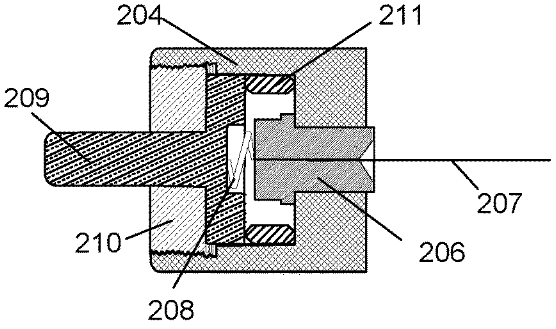
FIG. 2F schematically illustrates a cross-sectional side view of the assembly of FIG. 2E with the retaining ring tightened down such as to provide pressure to cause the knife edges of the double knife edge sealing ring to penetrate, respectively, an axially-facing inner surface of the feedthrough jacket and the underside of the outer portion of the anode terminal, and to force the electrical contact spring into contact with the anode terminal in accordance with example embodiments.

FIG. 2E schematically illustrates a cross-sectional side view of the assembly of FIG. 2D with a threaded retaining ring 210 that has just started to be engaged with a complementary threaded inner surface portion of the feedthrough jacket 204. The double knife edge sealing ring 211 includes two knife edges 212, 213 that are each axially directed. The knife edge 212 is pointed towards the outer portion underside of the anode terminal 209, while the knife edge 213 is pointed towards the inside surface of the feedthrough jacket 204. Both knife edges 212, 213 will penetrated these respective adjacent surfaces when the retaining ring 210 is tightened down as illustrated at FIG. 2F. The threaded retaining ring 210 is disposed axially adjacent to a top side of an outer portion of the anode terminal 209 and is closed around an axially elongated inner portion of the anode terminal 209 in accordance with example embodiments.

FIG. 2F schematically illustrates a cross-sectional side view of the assembly of FIG. 2E with the retaining ring 210 tightened down such as to provide pressure to cause the knife edges 212,213 of the double knife edge sealing ring 211 to penetrate, respectively, an axially-facing inner surface of the feedthrough jacket 204 and the underside of the outer portion of the anode terminal 209, and to force the electrical contact spring 208 into contact with the anode terminal 209 in accordance with example embodiments.

Glass to Metal Electrode Feedthrough Seals

Figure 2G:
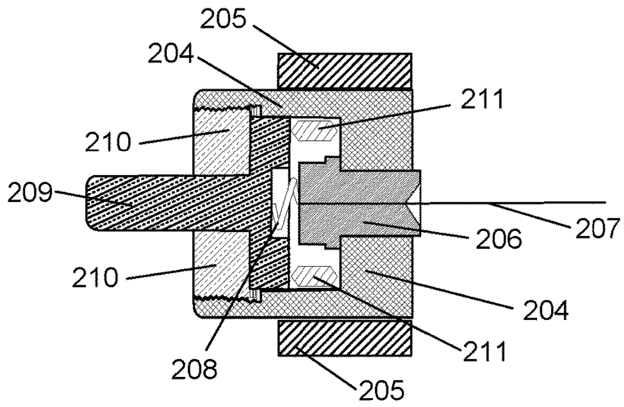
FIG. 2G schematically illustrates a cross sectional side view of the assembly of FIG. 2F with a glass ring or a glass sleeve disposed around the outside of the feedthrough jacket in accordance with example embodiments.
Figure 2H:
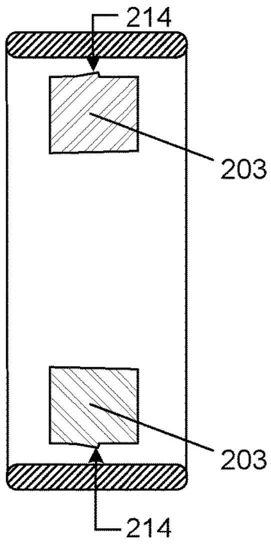
FIG. 2H schematically illustrates a cross-sectional side view of an end plug with a radially protruding knife edge defining a feedthrough aperture in accordance with example embodiments, wherein the feedthrough aperture is not quite large enough at ambient temperature for receiving the anode terminal feedthrough assembly with the glass ring or the glass sleeve disposed around it as illustrated at FIG. 2G, so a band heater has been placed around the end plug to apply heat and cause expansion of the end plug.
Figure 2I:
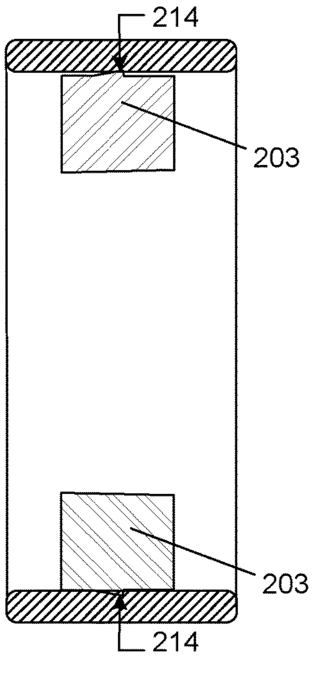
FIG. 2I schematically illustrates a cross-sectional side view of an expanded end plug in accordance with example embodiments which is at a higher temperature following application of heat by the band heater than the ambient temperature of the end plug of FIG. 2H and has expanded in accordance with its coefficient of thermal expansion.
Figure 2J:
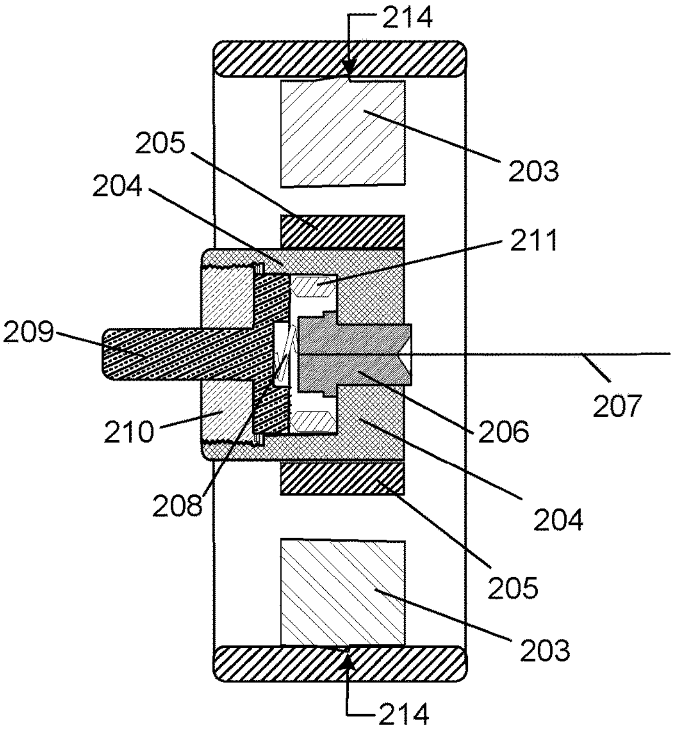
FIG. 2J schematically illustrates a cross-sectional side view of the anode terminal feedthrough with glass ring or glass sleeve of FIG. 2G inserted into the expanded feedthrough aperture defined within the expanded end plug of FIG. 2I in accordance with example embodiments.

FIG. 2G schematically illustrates a cross sectional side view of the assembly of FIG. 2F with a glass ring 205 or a glass sleeve 205 disposed around the outside of the feedthrough jacket 204 in accordance with example embodiments. The process provides in certain embodiments an assembly comprising end plug 203, feedthrough 204 and glass sleeve 205. The thickness of the insulating glass sleeve 205 may be calculated in certain embodiments based on applied voltage to the terminal and dielectric properties of the glass 205, in order to assure proper insulation. Two types of glass to metal seals include type 1, which is a matched combination that is useful particularly in an example embodiment wherein the coefficient of thermal expansion, or CTE, of the glass 205 and metal 203,204 are similar in order to maintain a stable seal. FIGS. 2H-2J schematically illustrate Type 2 glass to metal seal processes in accordance with example embodiments. Type 2 glass to metal seals may include compression seals such as when a metal exerts radial pressure to the glass to maintain a stable seal. Ref:3 (https://www.us.schott.com/epackaging/english/overview/technologies/gtms/index.html, which is incorporated by reference).

FIG. 2H schematically illustrates a cross-sectional side view of an end plug 203 with a radially protruding knife edge 214 defining a feedthrough aperture in accordance with example embodiments, wherein the feedthrough aperture is not quite large enough at ambient temperature for receiving the anode terminal feedthrough assembly 204 with the glass ring 205 or the glass sleeve 205 disposed around it as illustrated at FIG. 2G, so a band heater 201 or other heat source may be used to apply heat 201 to the end plug 203 and cause expansion of the end plug 203 so that the anode terminal feedthrough assembly 204 can be inserted into the aperture defined in the end plug 203.

FIG. 2I schematically illustrates a cross-sectional side view of an expanded end plug 203 in accordance with example embodiments which is at a higher temperature, following application of heat 201 by the band heater 201 or other heat source 201, than the ambient temperature of the end plug 203 at the earlier stage illustrated at FIG. 2H or throughout a Type 1 glass to metal seal process. The plug 203, shown in FIG. 2I schematically, has expanded in accordance with its coefficient of thermal expansion.

FIG. 2J schematically illustrates a cross-sectional side view of the anode terminal feedthrough 204 with glass ring 205 or glass sleeve 205 of FIG. 2G inserted into the expanded feedthrough aperture defined within the expanded end plug 203 of FIG. 2I in accordance with example embodiments.

Figure 2K:
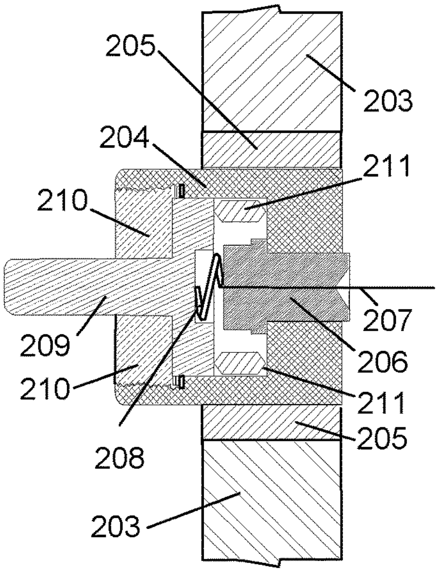
FIG. 2K schematically illustrates a cross-sectional side view of the assembly of FIG. 2J with band heater removed or turned off and the expanded end plug shrunken by cooling to ambient temperature to form by compression a hermetic seal for the anode terminal feedthrough with glass ring or glass sleeve within the feedthrough cavity of an end plug for a drift tube in accordance with example embodiments.

FIG. 2K schematically illustrates a cross-sectional side view of the assembly of FIG. 2J with band heater 201 removed or turned off and the expanded end plug 203 shrunken by cooling to ambient temperature to form by compression a hermetic seal for the anode terminal feedthrough 204 with glass ring 205 or glass sleeve 205 within the feedthrough cavity of an end plug 203 for a drift tube 202 in accordance with example embodiments.

Example materials for end plugs 203 and feedthrough jackets 204 include Alloy 52, ASTM F-15 (Kovar), CRS, Molybdenum, and AlSiC.

Examples of Glass materials for glass ring 205 or glass sleeve 205 include borosilicate 7052, borosilicate 7070, and borosilicate 9010 (each from Corning, https://www.corning.com/worldwide/en.html) which is incorporated by reference.

Examples of materials for anode terminal 209 and retaining ring 210 include Alloy 52, ASTM F-15 (Kovar), and CRS.

Examples of materials for double knife edge sealing ring 211 include Cu Alloys, Brass, Indium or similarly malleable materials. The knife edges 212, 213 may be formed in the double knife edge sealing ring 211 or the knife edges 212, 213 may protrude from the underside of the anode terminal 209 and/or from the interior of the feedthrough jacket 204 opposite the sealing ring 211. The components that are formed with the harder material will have the knife edge protrusions formed therein, while the knife edge protrusions 212, 213 will penetrate the surfaces of the components that are formed with softer materials in multiple example embodiments.

Examples of materials for wire grippers include Cu Alloy, Brass and similar materials with similar properties.

The glass sealing process may in certain example embodiments be formed first prior to the knife edge sealing of the Plug 203 to the Aluminum tube 202, as described with reference to FIGS. 1A-1G. The wire 207 may be fed through a wire gripper 206 in certain example embodiments, and sealed using a retainer 210 pushing against anode terminal 209 via a pressing ring 211 in the example illustrated schematically in FIGS. 2D-2G. A spring 208 or malleable material 208 such as indium, or Sn—Pb 208 may provide a connection, in certain example embodiments between a wire 207 and an anode terminal 209.

The wire 207 may be fed through wire gripper 206 and crimped in certain embodiments. The sealing ring 211 may be inserted into feedthrough jacket 204 in certain embodiments. Feedthrough jacket 204 may in certain embodiments include part of the glass to metal seal that includes end plug 203 and glass ring 205 or glass sleeve 205. Conductive spring 208 may be inserted into anode terminal 209 in certain embodiments. Contact spring 208 and anode terminal 209 may be inserted into a cavity within feedthrough jacket 204. Threaded retaining ring 210 may be tightened down to retain anode terminal 209 pressing against sealing ring 211 to provide a hermetic seal.

Figure 2L:
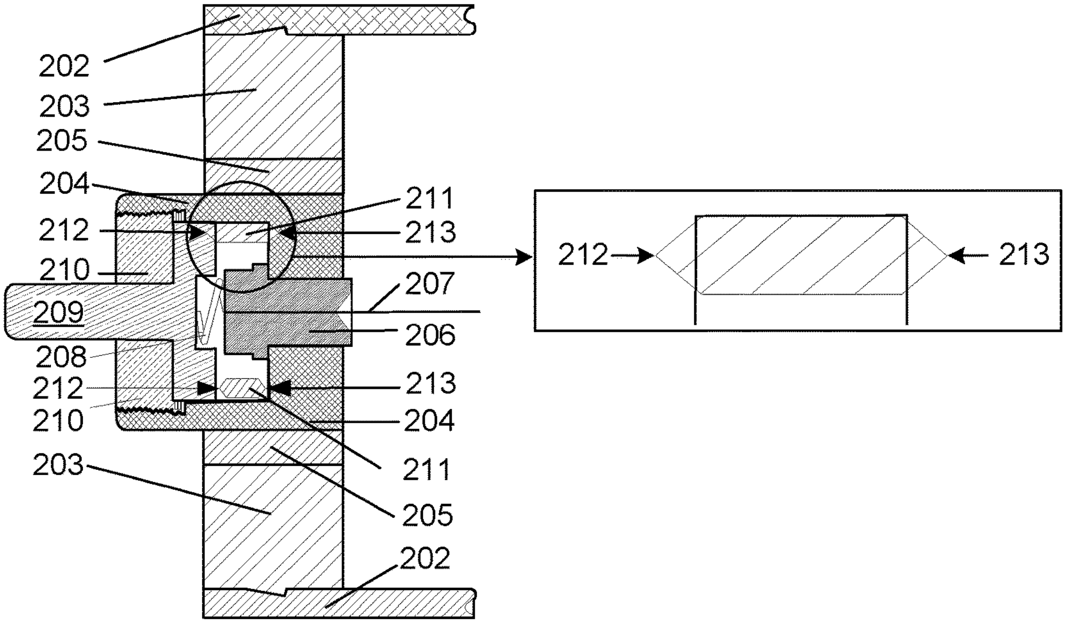
FIG. 2L schematically illustrates a cross-sectional side view of a hermetically sealed end of a drift tube after forming a knife edge seal between the end plug of FIG. 2K and the inner surface of the drift tube by applying the process illustrated at FIGS. 1A-1G in accordance with example embodiments.

FIG. 2L schematically illustrates a cross-sectional side view of a hermetically sealed end of a drift tube 202 after forming a hermetic seal using a knife edge 214 between the end plug 203 of FIG. 2K and the inner surface of the drift tube 202 by applying the process illustrated at FIGS. 1A-1G in accordance with example embodiments.

Figure 2M:
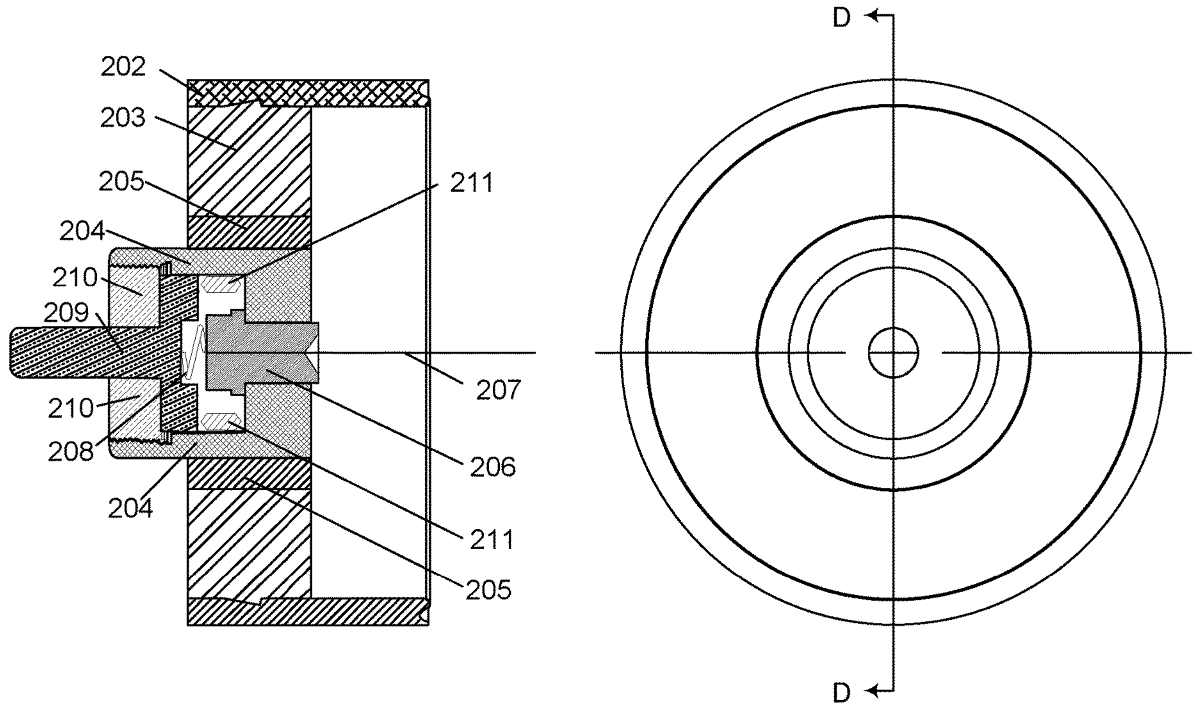
FIG. 2M schematically illustrates an axial cross-sectional view through the apex of the knife edge of the end plug of the sealed end of the drift tube of FIG. 2L.

FIG. 2M schematically illustrates an axial cross-sectional view through the apex of the knife edge 214 of the end plug 203 of the sealed end of the drift tube 202 of FIG. 2L.

Figure 2N:
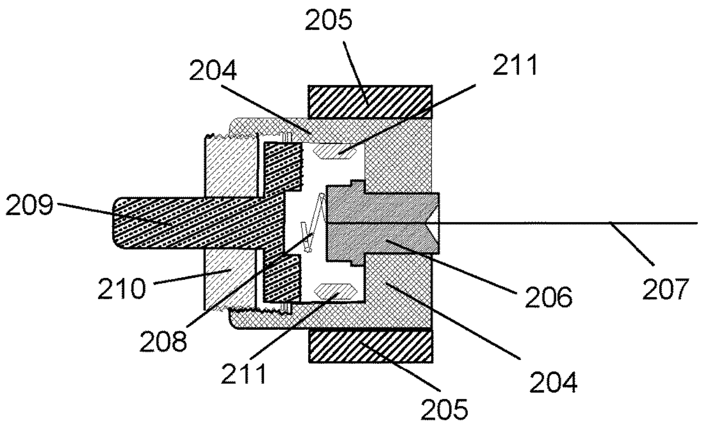
FIGS. 2N, 2O and 2P illustrate alternative embodiments of processes of assembling a drift tube with true hermetic seal, wherein insertion of the glass ring or glass sleeve around an anode terminal feedthrough assembly, insertion into an anode terminal feedthrough aperture of an end plug for a drift tube, and/or insertion and hermetic sealing by knife edge of the end plug at the end of the drift tube are, respectively, performed prior to tightening down the retaining ring introduced at FIG. 2E to form a hermetic seal between the anode terminal and the anode terminal feedthrough jacket via the double knife edge sealing ring introduced at FIG. 2C.
Figure 2O:
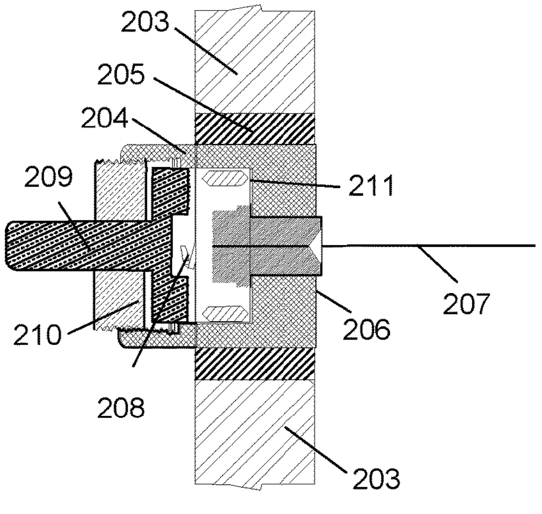
Figure 2P:
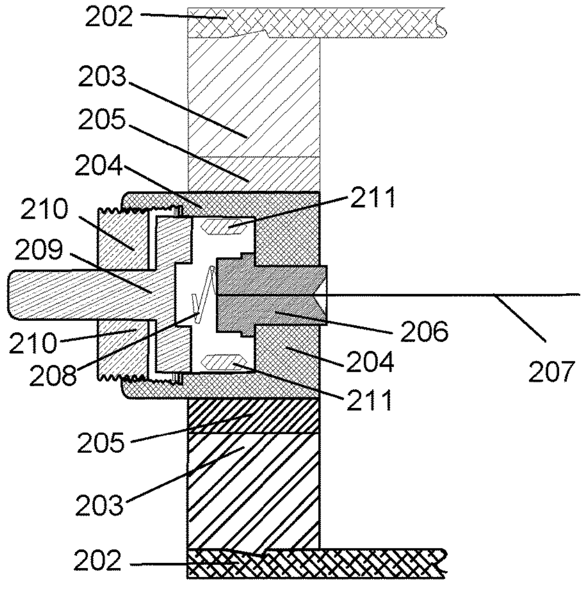
Figure 3A:
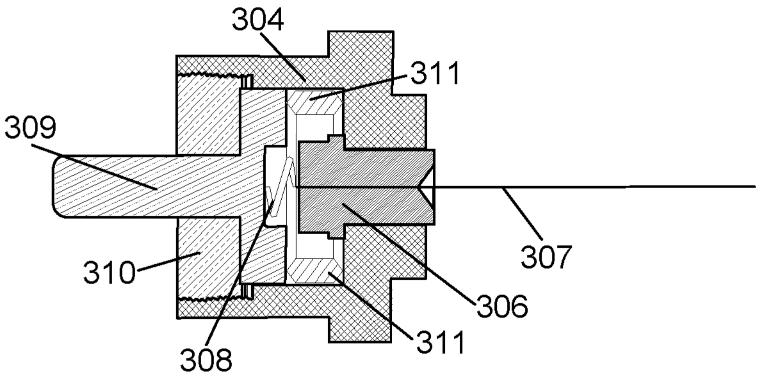
FIG. 3A schematically illustrates a cross sectional side view of an anode terminal feedthrough assembly for insertion within a feedthrough aperture of an end plug for a drift tube with true hermetic seal in accordance with example embodiments, wherein the anode terminal and the feedthrough jacket are hermetically sealed using a double knife edge sealing ring such as that shown and described with reference to FIGS. 2C-2F, and wherein the feedthrough jacket may be shaped differently such as in the example of FIG. 3A compared with the example of FIG. 2B, and the feedthrough jacket of FIG. 3A may serve to electrically insulate the end plug from the anode terminal in accordance with example embodiments, wherein the glass ring or glass sleeve of FIG. 2G may serve to electrically insulate the end plug from the anode terminal in example embodiments.
Figure 3B:
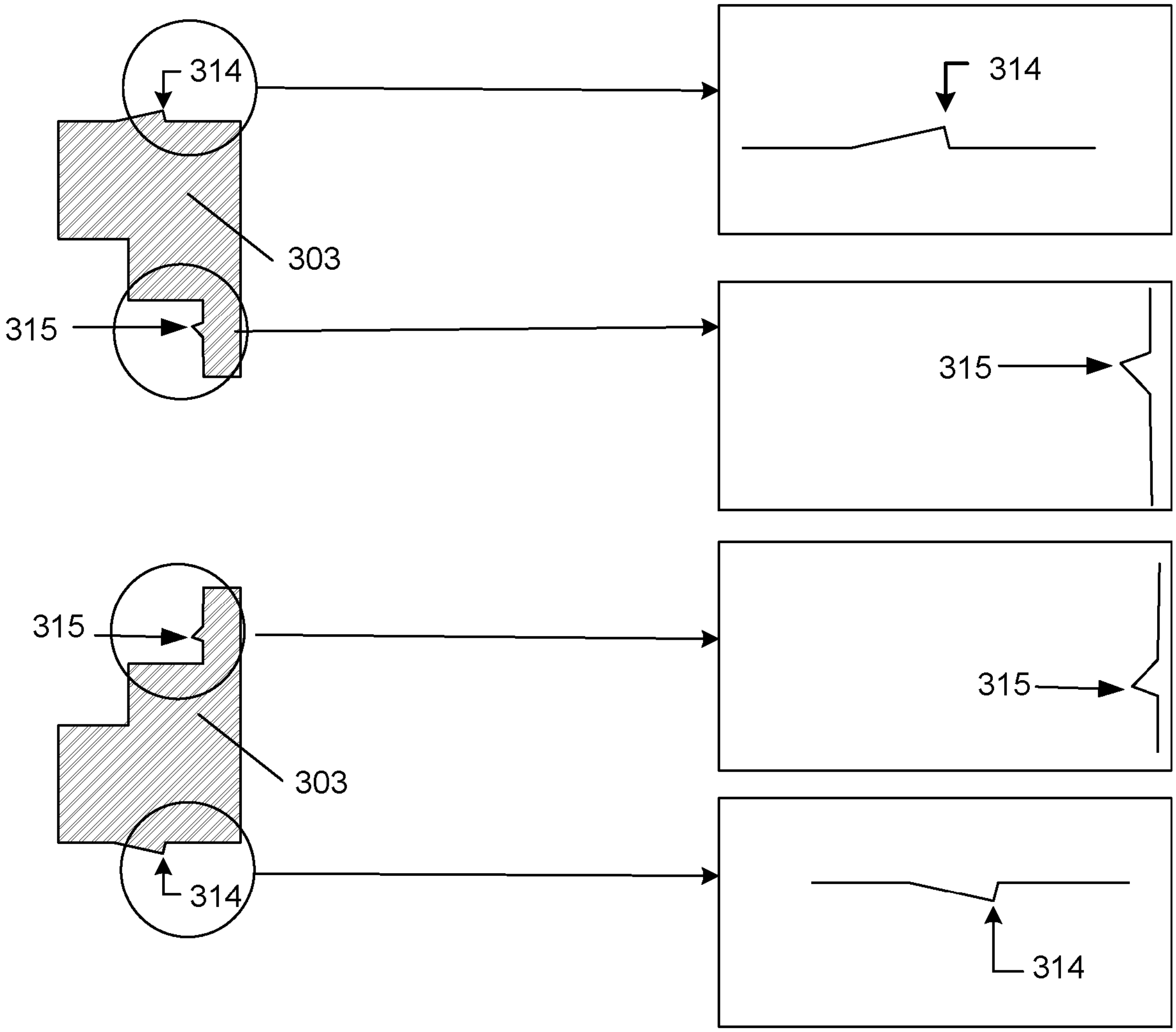
FIG. 3B schematically illustrates a cross-sectional side view of an end plug for a drift tube that defines an electrical feedthrough aperture for an anode terminal feedthrough, wherein the end plug includes an axially protruding knife edge for forming a hermetic seal with the feedthrough jacket of the anode terminal feedthrough assembly and a radially protruding knife edge for sealing with an inner surface at one end of a drift tube with true hermetic seal in accordance with example embodiments.
Figure 3C:
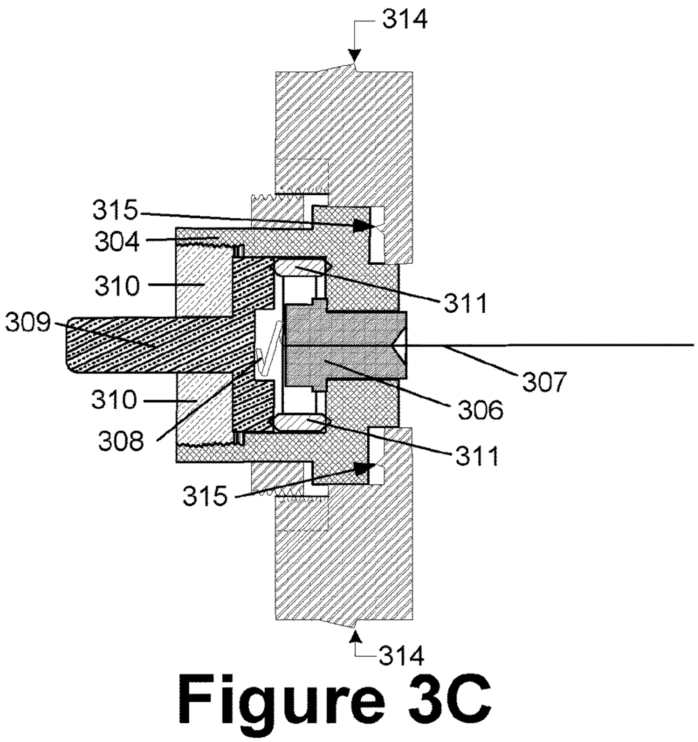
FIG. 3C schematically illustrates a cross-sectional side view of the anode terminal feedthrough assembly of FIG. 3A inserted into the feedthrough aperture of the end plug of FIG. 3B and a second retaining ring just started in engaging a complementary threaded portion of the end plug configured for tightening causing penetration into the anode terminal feedthrough jacket by the axially protruding knife edge formed in the end cap and forming a hermetic seal in accordance with example embodiments.
Figure 3D:
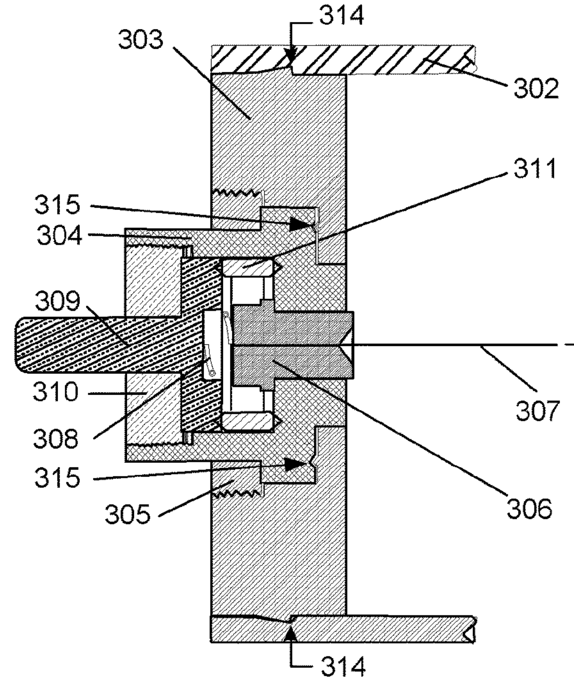
FIG. 3D schematically illustrates a cross-sectional side view of a hermetically sealed end of a drift tube after tightening the second retaining ring to form the knife edge seal between the anode terminal feedthrough jacket and the end plug, and after forming another knife edge seal between the end plug of FIG. 3B,3C and the inner surface of the drift tube by applying the process illustrated at FIGS. 1A-1G in accordance with example embodiments.
Figure 3E:
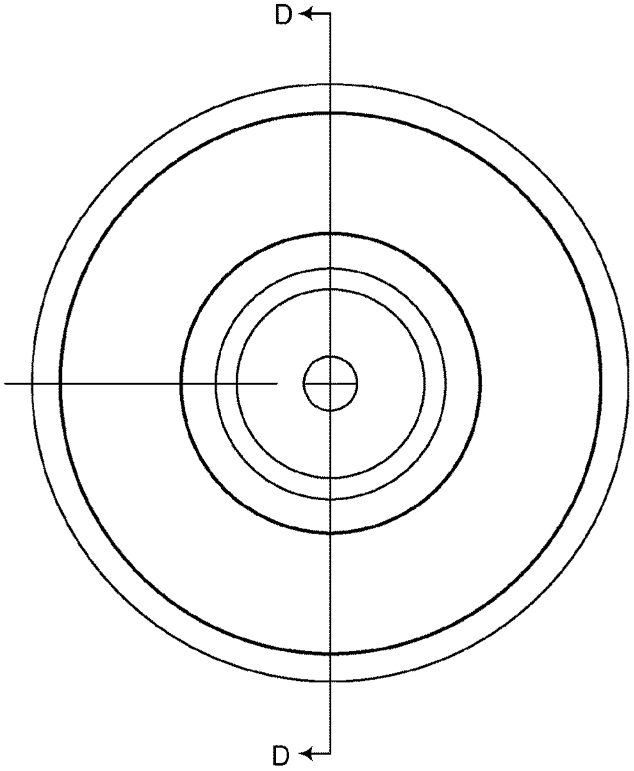
FIG. 3E schematically illustrates an axial cross-sectional view of the sealed end of the drift tube of FIG. 3D.

FIGS. 2N, 2O and 2P illustrate alternative embodiments of processes of assembling a drift tube with true hermetic seal, wherein insertion of the glass ring 205 or glass sleeve 205 around an anode terminal feedthrough assembly 204, insertion into an anode terminal feedthrough aperture of an end plug 203 for a drift tube 202, and/or insertion and hermetic sealing by knife edge 214 of the end plug 203 at the end of the drift tube 202 are, respectively, performed prior to tightening down the retaining ring 210 introduced at FIG. 2E to form a hermetic seal between the anode terminal 209 and the anode terminal feedthrough jacket 204 via the double knife edge sealing ring 211 introduced at FIG. 2C.

Knife-Edge Electrode Feedthrough Seals

FIGS. 3A-3F schematically illustrate example embodiments of processes for assembling drift tubes 302 that provide insulation and sealing of terminal 304 to plug 303 using knife edges 315 and compression design techniques. In certain embodiments, the seal between the anode feedthrough terminal 309 and the end plug 303 is formed first prior to forming a seal between the end plug 303 and the drift tube 302, e.g., an aluminum tube 302.

Referring now to the example schematic illustrations of FIGS. 3A-3F, an end plug 303 may be designed wherein an anode terminal 309 within a cavity defined at the center of the plug 303 is insulated from the plug 303 by plastic material jacket 304 and hermetically sealed using a knife edge 315 on the inside surface of plug 303. There may be two knife edges 314, 315 protruding from the end plug 303 to form seals in examples illustrated schematically at FIGS. 3A-3F. The wire 307 may be fed through a wire gripper 306 in some examples, and sealed in certain embodiments using a double knife edge sealing ring 311. A spring 308 or malleable material 308 such as indium, or Sn—Pb 308 may be used to provide a connection between a wire 307 and an anode terminal 309 in certain embodiments.

Examples of materials forming the feedthrough jacket 304 include Teflon, Peek, Delrin, and Noryl.

Examples of materials forming the end plug 303 and the double knife edge retaining ring 311 include Stainless Steel, Kovar, and Titanium.

Examples of materials forming the wire gripper 306, anode terminal 309 and retaining ring 310 include Cu Alloy, and Brass.

Referring to FIGS. 3A-3F, feedthrough jacket 304 may be inserted into end plug 303 in example embodiments. A second retaining ring 305 may be used to retain feedthrough jacket 304 inside end plug 303 and to provide a hermetic seal using a knife edge 315 in accordance with certain embodiments. The wire 307 may be fed through a wire gripper 306 in one subset of example processes and crimped. The double knife edge retaining ring 311 may be inserted into a cavity within the feedthrough jacket 304 in some examples. The sealing ring 311 includes two knife edges 312, 313 or is configured to receive two knife edges 312, 313, and either way these knife edges provide internal sealing in this embodiment and in this example. Knife edges 114, 212-214 and 312-315 in accordance with these and other example embodiments may have different shapes and sizes and material compositions. Contact spring 308 may be inserted into feedthrough terminal 309. Contact spring 308 and anode terminal 309 may be inserted into feedthrough jacket 304. Retaining ring 310 may be used to retain anode terminal 309 pressing against the double knife edge sealing ring 311 to provide a hermetic seal.

While an exemplary drawings and specific embodiments of the present invention have been described and illustrated, it is to be understood that that the scope of the present invention is not to be limited to the particular example embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "assembly" does not imply that the components or functionality described or claimed as part of the assembly are all configured in a common package. Indeed, any or all of the various components of an assembly, e.g., anode terminal feedthrough assembly or an assembly including an end cap or a drift tube, may be combined in a single package or separately maintained and may further be manufactured, assembled or distributed at or through multiple locations.

Additionally, the various embodiments set forth herein are described in terms of exemplary schematic diagrams and other illustrations. As will be apparent to one of ordinary skill in the art after reading this document, the illustrated embodiments and their various alternatives may be implemented without confinement to the illustrated examples. For example, schematic diagrams and their accompanying description should not be construed as mandating a particular architecture or configuration.

In addition, all references cited herein, as well as the background, abstract and brief description of the drawings, are all incorporated by reference into the detailed description of the embodiments as disclosing alternative embodiments. Several embodiments of drift tubes with true hermetic seals have been described herein and schematically illustrated by way of example physical and electronic architectures.

I claim:

1. A method of hermetically sealing a drift tube, comprising:

(a) applying heat to an end of a drift tube which has a first inner diameter at a first temperature until the drift tube has expanded to have a larger second inner diameter at a higher second temperature;

(b) inserting a plug at a first end of the drift tube when the drift tube has said larger second inner diameter at said higher second temperature;

(c) removing the applied heat from the drift tube which shrinks back to having said first inner diameter at said first temperature;

(d) wherein said plug comprises an approximately cylindrically symmetric knife edge protruding outward from an otherwise approximately cylindrical outer plug surface, such that said plug substantially exhibits a first plug outer diameter except at said knife edge where said plug exhibits a larger second plug outer diameter;

(e) wherein said second inner diameter of said drift tube is larger than said second plug outer diameter at said knife edge, and said first inner diameter of said drift tube is smaller than said second plug outer diameter; and (f) wherein said knife edge penetrates said drift tube as it cools and shrinks to provide a hermetic seal between said plug and said end of said drift tube.

2. The method of claim 1, further comprising repeating the applying heat to another end of the drift tube, inserting a second plug and removing the applied heat, such that a second knife edge protruding outward from another approximately cylindrically symmetric knife edge penetrates said tube at said second end as it cools and shrinks to provide a hermetic seal between said second plug and said second end of said drift tube.

3. The method of claim 2, wherein said drift tube with said hermetic seals at each end exhibits a leak rate that is less than $10^{-10}$ atm-cc/sec.

4. The method of claim 3, wherein said leak rate is not less than $10^{-11}$ atm-cc/sec.

5. The method of claim 1, wherein said second plug outer diameter differs from said first plug outer diameter by between 0.13 mm-0.18 mm.

6. The method of claim 1, comprising inserting a tapered thread fitting into said plug prior to inserting said plug at said first end of said drift tube, said tapered thread fitting being configured for introducing a gas mixture into the drift tube.

7. The method of claim 1, wherein said plug comprises a material with a hardness value that is at least 1.3 times that of the drift tube material.

8. The method of claim 1, wherein an apex of the knife edge comprises a radius that is not more than 0.001 inches.

9. The method of claim 1, wherein an apex of said knife edge comprises a vertex of an angle between 70° and 110°.

10. The method of claim 1, wherein the drift tube comprises aluminum and said higher second temperature comprises at least 220° C.

11. A hermetically sealed drift tube including an end plug with an insulated electrical feedthrough, comprising:
- a) a drift tube including approximately cylindrical inner and outer diameters along its length;
- b) an end plug including an outer diameter approximately equal to the inner diameter of the drift tube along its length, except for an approximately cylindrically symmetric first knife edge protruding radially outward from an otherwise approximately cylindrical outer plug surface and penetrating an inner surface of said drift tube to provide a hermetic seal between said end plug and said inner surface of said drift tube;
- c) an electrical feedthrough aperture defined in the end plug;
- d) an electrode protruding axially at one end of said drift tube and coupled via said electrical feedthrough aperture to a wire within said drift tube;
- e) an electrical feedthrough including an insulating jacket around said electrode disposed within said aperture in said end plug, wherein said end plug comprises a second approximately cylindrically symmetric knife edge protruding axially and penetrating said insulating jacket to provide a hermetic seal between said end plug and said insulating jacket;
- f) a double-knife edge ring, including a third knife edge penetrating said insulating jacket and a fourth knife edge penetrating said electrode to provide a hermetic seal between the insulating jacket and the electrode.

12. The drift tube of claim 11, comprising a second end plug including an outer diameter approximately equal to the inner diameter of the drift tube along its length, except for an approximately cylindrically symmetric first knife edge protruding radially outward from an otherwise approximately cylindrical outer plug surface and penetrating an inner surface of a second end of said drift tube to provide a hermetic seal between said second end plug and said inner surface of said second end of said drift tube.

13. The drift tube of claim 12, wherein said drift tube with said hermetic seals at each end exhibits a leak rate that is less than $10^{-10}$ atm-cc/sec.

14. The drift tube of claim 13, wherein said leak rate is not less than $10^{-11}$ atm-cc/sec.

15. The drift tube of claim 11, wherein said first knife edge protrudes from said outer plug surface by between 0.025 mm-0.2 mm.

16. The drift tube of claim 11, comprising a tapered thread fitting through said plug at said first end of said drift tube, said tapered thread fitting being configured for introducing a gas mixture into the drift tube.

17. The drift tube of claim 11, wherein said plug comprises a material with a hardness value that is at least 1.3 times that of the drift tube material.

18. The drift tube of claim 11, wherein an apex of the first knife edge comprises a radius that is not more than 0.001 inches.

19. The drift tube of claim 11, wherein an apex of said first knife edge comprises a vertex of an angle between 70° and 110°.

20. The drift tube of claim 11, wherein the drift tube comprises aluminum and said end plug comprises stainless steel, kovar, invar or titanium or combinations thereof.

* * * * *